United States Patent
Aoyama (10) Patent No.: US 9,169,619 B2
(45) Date of Patent: Oct. 27, 2015

(54) WHEEL LOADER

(71) Applicant: KOMATSU LTD., Tokyo (JP)

(72) Inventor: Yuichiro Aoyama, Komatsu (JP)

(73) Assignee: KOMATSU LTD., Tokyo (JP)

( * ) Notice: Subject to any disclaimer, the term of this patent is extended or adjusted under 35 U.S.C. 154(b) by 44 days.

(21) Appl. No.: 14/237,434

(22) PCT Filed: Aug. 7, 2013

(86) PCT No.: PCT/JP2013/071389
§ 371 (c)(1),
(2) Date: Feb. 6, 2014

(87) PCT Pub. No.: WO2014/184967
PCT Pub. Date: Nov. 20, 2014

(65) Prior Publication Data
US 2015/0184360 A1    Jul. 2, 2015

(51) Int. Cl.
*E02F 9/08* (2006.01)
*F02M 35/04* (2006.01)
*B60R 3/02* (2006.01)
*F02M 35/16* (2006.01)
*E02F 9/16* (2006.01)

(52) U.S. Cl.
CPC ............. *E02F 9/0833* (2013.01); *B60R 3/02* (2013.01); *E02F 9/0841* (2013.01); *E02F 9/0866* (2013.01); *E02F 9/0883* (2013.01); *E02F 9/16* (2013.01); *F02M 35/048* (2013.01); *F02M 35/164* (2013.01)

(58) Field of Classification Search
CPC ..... E02F 9/0833; E02F 9/0841; E02F 9/0866; E02F 9/0883; E02F 9/16; B60R 3/02; F02M 35/048; F02M 35/164

USPC ................................. 280/163, 166
See application file for complete search history.

(56) References Cited

U.S. PATENT DOCUMENTS 3,876,021 A * 4/1975 Baumgartner ............... 180/6.48
3,933,216 A * 1/1976 Irwin ............................ 180/309
(Continued)

FOREIGN PATENT DOCUMENTS

| JP | 2003-335268 A | 11/2003 |
| JP | 2007-162358 A | 6/2007 |
| JP | 3146866 U | 11/2008 |

OTHER PUBLICATIONS

The International Search Report for the corresponding international application No. PCT/JP2013/071389, issued on Nov. 12, 2013.

*Primary Examiner* — Brodie Follman
*Assistant Examiner* — Brian Cassidy
(74) *Attorney, Agent, or Firm* — Global IP Counselors, LLP (57) ABSTRACT

A wheel loader includes a cab, a ladder provided laterally of the cab, a vehicle body cover rear of the cab, an engine, an air cleaner and a platform disposed laterally of the cab. The engine is disposed inside an engine room defined by the cover. The air cleaner has an exchangeable filter to clean air supplied to the engine. The air cleaner is disposed outside of the cover and above/rear of the ladder. The ladder has a first top step projecting laterally relative to the platform, and steps below projecting laterally relative to the first step. Preferably at least one of the first and second steps has a larger projection amount than the step below. Preferably, a projection amount of a third step positioned at a bottom is smaller than a projection amount of at least one of the first and second steps.

17 Claims, 8 Drawing Sheets

(56) References Cited

U.S. PATENT DOCUMENTS

| | | | |
|---|---|---|---|
| 5,046,582 A * | 9/1991 | Albrecht | 182/127 |
| 5,064,022 A * | 11/1991 | Graham | 182/85 |
| 2003/0221908 A1* | 12/2003 | Fix | 182/127 |
| 2009/0145692 A1* | 6/2009 | Flickinger et al. | 182/127 |
| 2010/0025954 A1* | 2/2010 | Gottlinger et al. | 280/166 |
| 2010/0090517 A1* | 4/2010 | Kramer et al. | 299/36.1 |
| 2010/0122871 A1* | 5/2010 | Gottlinger | 182/106 |
| 2011/0303486 A1* | 12/2011 | Halverson | 182/127 |
| 2012/0267916 A1* | 10/2012 | Ringer et al. | 296/190.11 |
| 2014/0175833 A1* | 6/2014 | Masuda et al. | 296/190.01 |

\* cited by examiner

WHEEL LOADER

CROSS-REFERENCE TO RELATED APPLICATIONS

This application is a U.S. National stage application of International Application No. PCT/JP2013/071389, filed on Aug. 7, 2013.

BACKGROUND

1. Field of the Invention

The present invention relates to a wheel loader.

2. Background Information

An exhaust gas post-treatment device is mounted on a wheel loader. The exhaust gas post-treatment device includes a diesel particulate filtering device that collects and removes particulate matter such as smoke and the like included in the diesel engine exhaust. The diesel particulate filtering device is mounted in a row with an air cleaner on an upper portion of the engine. A nitrogen oxide reduction catalyst device may also be provided to remove NOx from the exhaust. The nitrogen oxide reduction catalyst device is provided on the exhaust downstream side of the diesel particulate filtering device.

As described above, while the diesel particulate filtering device is disposed with the air cleaner on an upper portion of the engine, the installation location of the nitrogen oxide reduction catalyst device becomes a problem if the nitrogen oxide reduction catalyst device is installed along with the diesel particulate filtering device. Since the nitrogen oxide reduction catalyst device needs to be disposed on the exhaust downstream side of the diesel particulate filtering device, generally the nitrogen oxide reduction catalyst device is mounted in a row with the air cleaner and the diesel particulate filtering device on the upper portion of the engine when the nitrogen oxide reduction catalyst device is installed along with the diesel particulate filtering device.

However, a problem arises with the spatial relationship when the air cleaner, the diesel particulate filtering device, and the nitrogen oxide reduction catalyst device are all disposed in a row above the engine. Therefore, while disposing a relatively light air cleaner above the diesel particulate filtering device and the nitrogen oxide reduction catalyst device may be considered, the top plate of the engine room becomes higher in this case and visibility to the rear is reduced.

Accordingly, a configuration has been proposed for a large-scale dump truck described in Japanese Patent Laid-open Publication No. 2003-335268 in which an engine room is provided beside the cab and an air cleaner is disposed on the outside of the engine room. With such a configuration, visibility to the rear is not reduced when the air cleaner is disposed on the upper portion of the engine room.

SUMMARY

However, since the engine room is disposed to the rear of the cab in a wheel loader, visibility to the rear may become reduced if the configuration described in Japanese Patent Laid-open Publication No. 2003-335268 is applied as-is to the wheel loader. Further, the air cleaner needs to be disposed to allow for ease of maintenance work since the filter inside the air cleaner requires regular cleaning and exchanging at certain time periods.

An object of the present invention is to prevent a reduction in visibility to the rear and to enable ease of maintenance work in a wheel loader.

(1) A wheel loader according to a first aspect of the present invention is provided with a cab, a ladder, a vehicle body cover, an engine, an air cleaner, and a platform. The cab is provided with a driver seat inside the cab. The ladder has at least three steps and is provided in a first lateral direction of the cab. The ladder is used by an operator for ascending to and descending from the cab. The steps are disposed with an interval between each other in the vertical direction. The vehicle body cover is disposed to the rear of the cab and defines an engine room. The engine is disposed inside the engine room. The air cleaner includes therein a filter that is exchangeable and cleans air supplied to the engine. The air cleaner is disposed outside of the vehicle body cover and above and to the rear of the ladder. The platform is disposed in the first lateral direction of the cab. The ladder extends downward from the platform. A first step positioned at the top projects in the first lateral direction with respect to the platform. Steps below the first step project in the first lateral direction with respect to one step above. At least one of the first step and a second step positioned second from the top has a larger projection amount than a step below the second step.

The air cleaner in the wheel loader is provided on the outside of the vehicle body cover and above and to the rear of the ladder, and is not provided in the engine room. According to this configuration, since the air cleaner is disposed outside of the engine room, a top plate of the engine room does not need to be made higher even if an exhaust gas post-treatment device is installed above the engine inside the engine room. Therefore, a reduction in visibility to the rear can be avoided despite the installation of the exhaust gas post-treatment device. Moreover, since the air cleaner is disposed above and to the rear of the ladder, maintenance work on the air cleaner can be performed by the operator while standing on the ladder and the maintenance work can be performed easily.

Moreover, at least one of the first step and the second step has a larger projection amount than the other steps. When the amount of projection of the first step is larger than the amount of projection of the other steps, the operator is able to stand on the first step and perform the maintenance work on the air cleaner without hitting the platform with a shin or other body part. When the amount of projection of the second step is larger than the amount of projection of the other steps, the operator is able to stand on the second step and perform the maintenance work on the air cleaner without hitting the platform with a shin or other body part.

(2) The first step and the second step are preferably longer in the front-back direction and in the vehicle width direction of the vehicle body than other steps.

According to this configuration, the operator is able to perform the maintenance work on the air cleaner while maintaining a stable posture on at least one of the first step and the second step.

(3) The air cleaner is preferably configured to allow the filter to be pulled out toward the ladder and disposed so that a side from which the filter is pulled out is further away from the cab than an opposite side. According to this configuration, the operator is able to remove the filter easily while standing on at least one of the first and second steps of the ladder.

(4) The ladder preferably has a front strut and a rear strut that extend in the vertical direction and that are disposed away from each other in the vehicle front-back direction. The steps extend so as to straddle between the front strut and the rear strut. The rear strut has an upper part and a lower part. The first and second steps are attached to the upper part of the rear strut. The other steps are attached to the lower part of the rear strut. The lower part of the rear strut is positioned further toward the front than the upper part.

According to this configuration, the first and second steps are attached to the upper part of the rear strut, and the upper part of the rear strut is positioned further to the rear than the lower part. As a result, the first and second steps extend further to the rear than the other steps and the operator is able to perform the maintenance work in a position nearer the air cleaner.

(5) The rear strut preferably has a middle part that couples the upper part and the lower part. The middle part is inclined rearward in an upward direction as seen in a side view.

(6) The ladder preferably has a handrail member provided on the rear strut. The handrail member has a vertical part that extends vertically. The vertical part is positioned in the first lateral direction of the rear strut. According to this configuration, since the vertical part of the handrail member is positioned in the first lateral direction of the rear strut, the operator is able to perform the maintenance work while applying his weight onto the vertical part, and consequently is able to perform the maintenance work of the air cleaner while maintaining a more stable posture.

(7) An upper end of the handrail member is preferably positioned below an upper surface of the platform disposed in the first lateral direction of the cab. According to this configuration, the operator will not trip over the handrail member while standing on the platform.

(8) The ladder preferably has a supplementary step that is below the step in the lowest position and that hangs down due to an elastic strip. According to this configuration, the operator is able to easily climb up the ladder from the step in the lowest position among the at least three steps described above, and easily climb down from the step in the lowest position to the ground. Since the supplementary step is disposed in a position near the ground, the supplementary step or the elastic strip may collide with an obstruction on the ground. However, the elastic strip for suspending the supplementary step does not undergo plastic deformation.

(9) The cab preferably has a cab body and a door. The rear part of the door is supported by the cab body. The door is able to be opened and closed toward the front. The air cleaner is disposed at a location that does not obstruct the door when the door is fully open.

According to this configuration, the door is not obstructed by the air cleaner when the driver opens or closes the door to enter or exit the cab.

(10) The wheel loader preferably further includes an operating fluid tank disposed between the cab and the engine. The air cleaner is disposed to the side of the operating fluid tank.

According to this configuration, since the air cleaner is disposed outside of the engine room as described above, a reduction in the visibility to the rear is avoided even if the exhaust gas post-treatment device is provided, and the maintenance work on the air cleaner can be performed easily.

(11) The wheel loader is preferably provided with a rear wheel fender disposed above a rear wheel. The air cleaner is fixed to an upper part of the rear wheel fender.

According to this configuration, since the air cleaner is disposed outside of the engine room as described above, a reduction in visibility to the rear is avoided even if the exhaust gas post-treatment device is provided, and the maintenance work on the air cleaner can be performed easily as described above.

(12) The wheel loader is further provided with an air cleaner cover. The air cleaner cover covers a portion where a pull-out opening for the filter and an air intake mouth are removed in the air cleaner. According to this configuration, the air cleaner is protected by the air cleaner cover.

(13) A wheel loader according to a second aspect of the present invention is provided with a cab, a ladder, a vehicle body cover, an engine, an air cleaner, and a platform. The cab is provided with a driver seat inside the cab. The ladder has at least three steps disposed with intervals in the vertical direction. The ladder is provided on the first lateral direction of the cab. The vehicle body cover is disposed to the rear of the cab and defines an engine room. The engine is disposed inside the engine room. The air cleaner includes therein a filter that is exchangeable and cleans air supplied to the engine. The platform is disposed on the first lateral direction of the cab. The air cleaner is disposed outside of the vehicle body cover and above and to the rear of the ladder. The ladder extends downward from the platform. A first step positioned at the top projects from the platform in the first lateral direction. Steps below the first step project in the first lateral direction from one step above. A third step positioned at the bottom projects less than at least one of the first step and a second step positioned second from the top.

Similar to the wheel loader of the first aspect, a reduction in visibility to the rear can be avoided and the maintenance work of the air cleaner can be performed more easily.

(14) The third step is preferably shorter in the front-back direction and in the vehicle width direction of the vehicle body than the first step and the second step.

According to the present invention, a reduction in visibility to the rear is prevented and the maintenance work on the air cleaner can be performed easily.

DETAILED DESCRIPTION OF EMBODIMENT(S)

Figure 1:
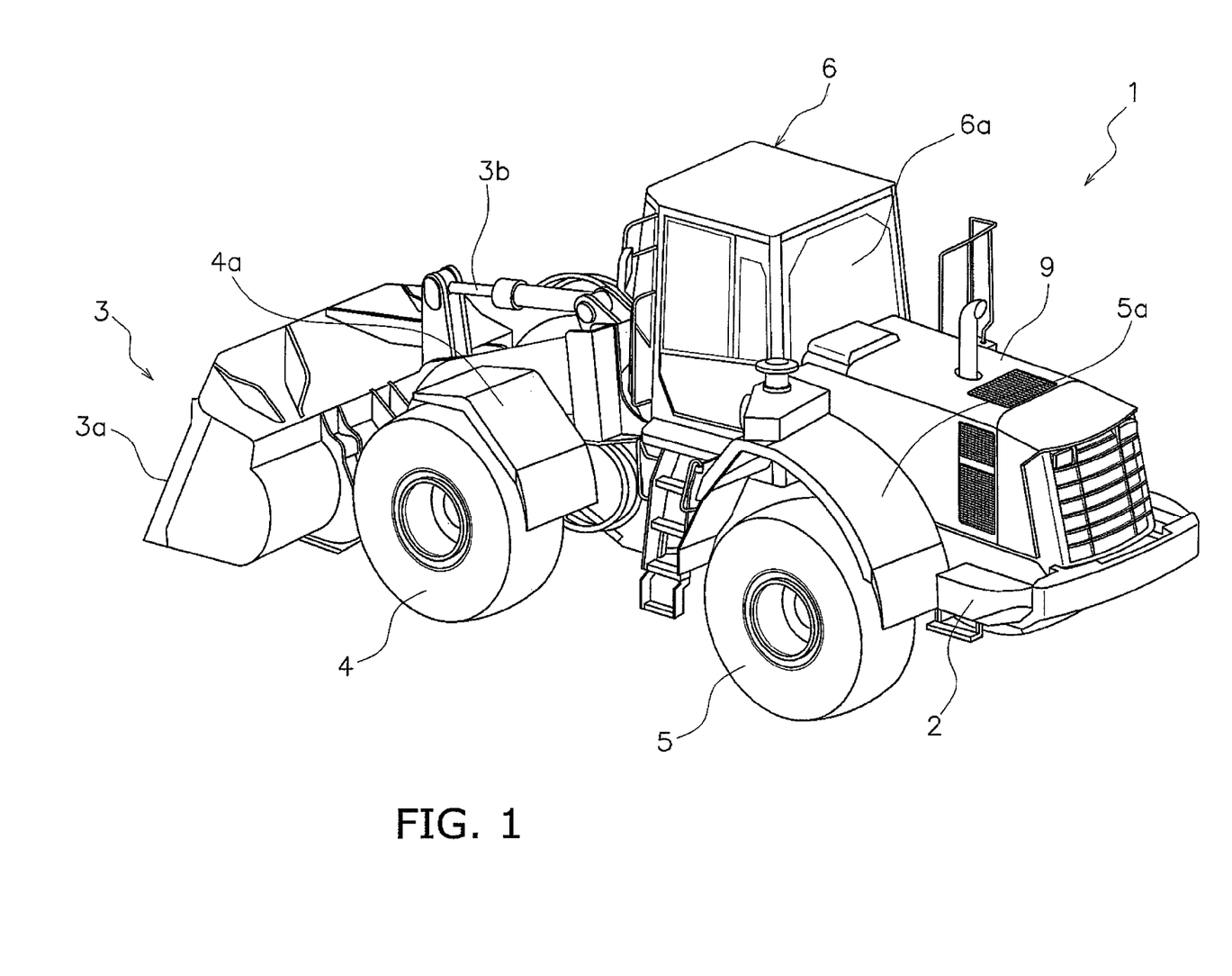
FIG. 1 is an external perspective view of a wheel loader according to a embodiment of the present invention.

An embodiment of a wheel loader according to the present invention will be explained below with reference to the drawings. FIG. 1 is a perspective view of a wheel loader as seen from the left rear. In the following description, "right," "left," "up," and "down" indicate directions relative to a state of looking forward from the operating cabin, and "vehicle width direction" and "crosswise direction" have the same meaning. Further, "width" signifies a length in the crosswise direction.
(Overall Configuration)

A wheel loader 1 includes a vehicle body frame 2, a work implement 3, front wheels 4, rear wheels 5, and a cab 6 as illustrated in FIG. 1. The wheel loader 1 is capable of traveling due to the rotation of the front wheels 4 and the rear wheels 5, and desired work can be conducted using the work implement 3.

The vehicle body frame 2 includes a front body part and a rear body part, and the front body part and the rear body part are connected to each other to allow for pivoting in the crosswise direction. The work implement 3 and the front wheels 4 are provided on the front body part. The rear wheels 5 and the cab 6 are provided on the rear body part. An operating cabin 6a and various operating members and an operating panel are provided inside the cab 6. The work implement 3 is disposed at the front of the front body part and includes a bucket 3a, a bucket cylinder 3b and the like. Fenders 4a, 5a are respectively provided above the front wheels 4 and the rear wheels 5.

Figure 2:
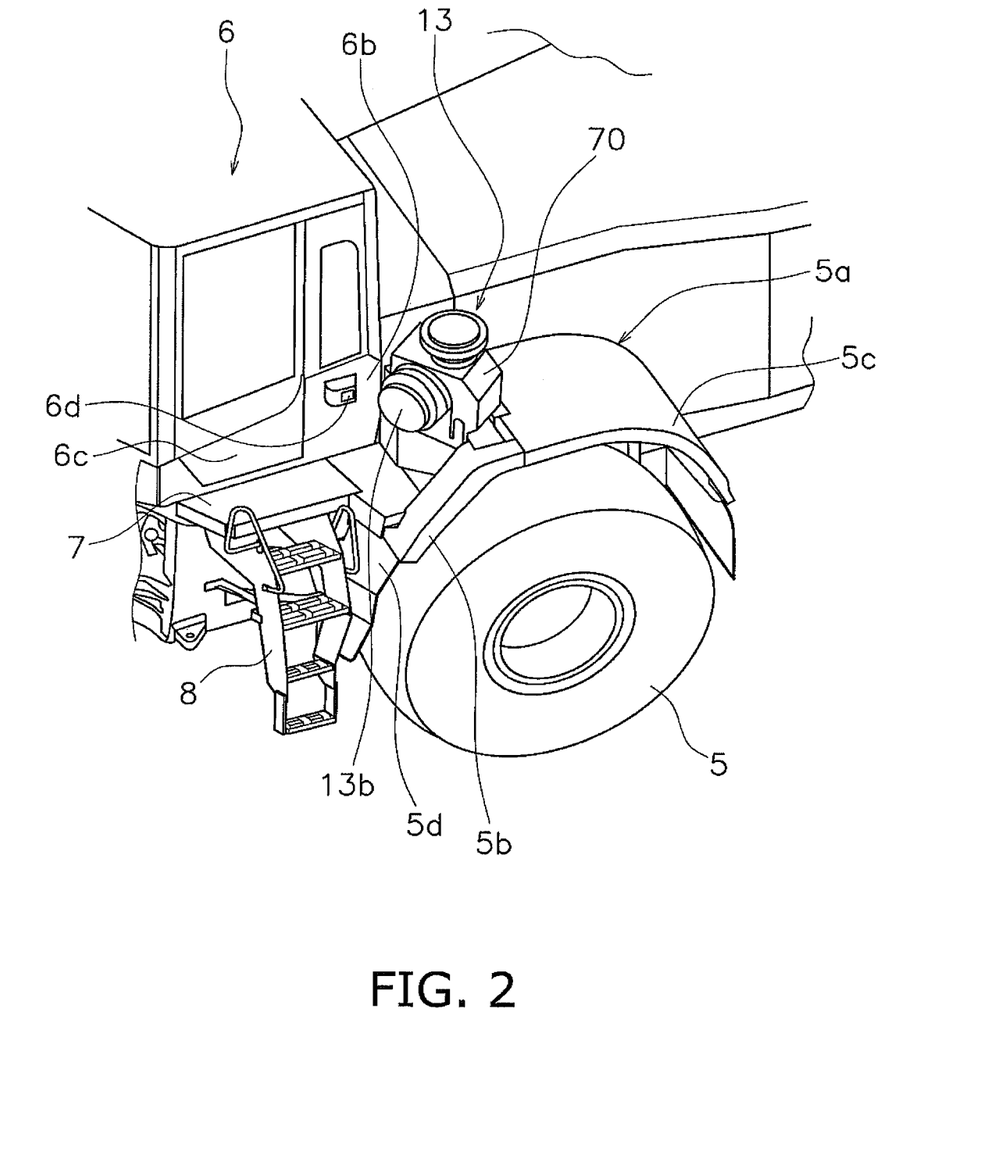
FIG. 2 is an external perspective of a partial view from the left front of the wheel loader of FIG. 1.

FIG. 2 is a perspective view of an area around the air cleaner as seen from the right front. As illustrated in FIG. 2, the rear wheel fender 5a has a fender front part 5b and a fender rear part 5c. The fender front part 5b is configured by a horizontal portion and a sloped portion that slopes forward and downward from the horizontal portion. The fender rear part 5c is formed in an arced shape as seen from the side and covers the upper part and the upper rear part of the rear wheel 5. A mud guard 5d extends downward from the front end of the fender front part 5b so as to cover the front of the rear wheel 5. More specifically, the mud guard 5d is formed along a rear strut 82b of a ladder 8 to be described below.

The cab 6 has a cab body 6b and a door 6c. The door 6c is supported at a rear end part by a hinge on the cab body 6b, and a front end part can be opened and closed. The maximum degree of opening of the door 6c is limited by a stopper 6d provided on the outside of the cab body 6b.

A platform 7 is disposed to the left side of the cab 6. More specifically, the platform 7 extends to the left from a lower end part of the cab 6. As a result, the operator can easily climb up and down the ladder 8 since a space for standing is secured on the outside of the door 6c. The platform 7 is attached to the vehicle frame 2.

The ladder 8 is provided on the left side (example of a first lateral direction) of the cab 6 to allow the operator to ascend to and descend from the cab 6. More specifically, the ladder 8 extends downward from the platform 7 and is disposed in front of the rear wheel fender 5a.

Figure 3:
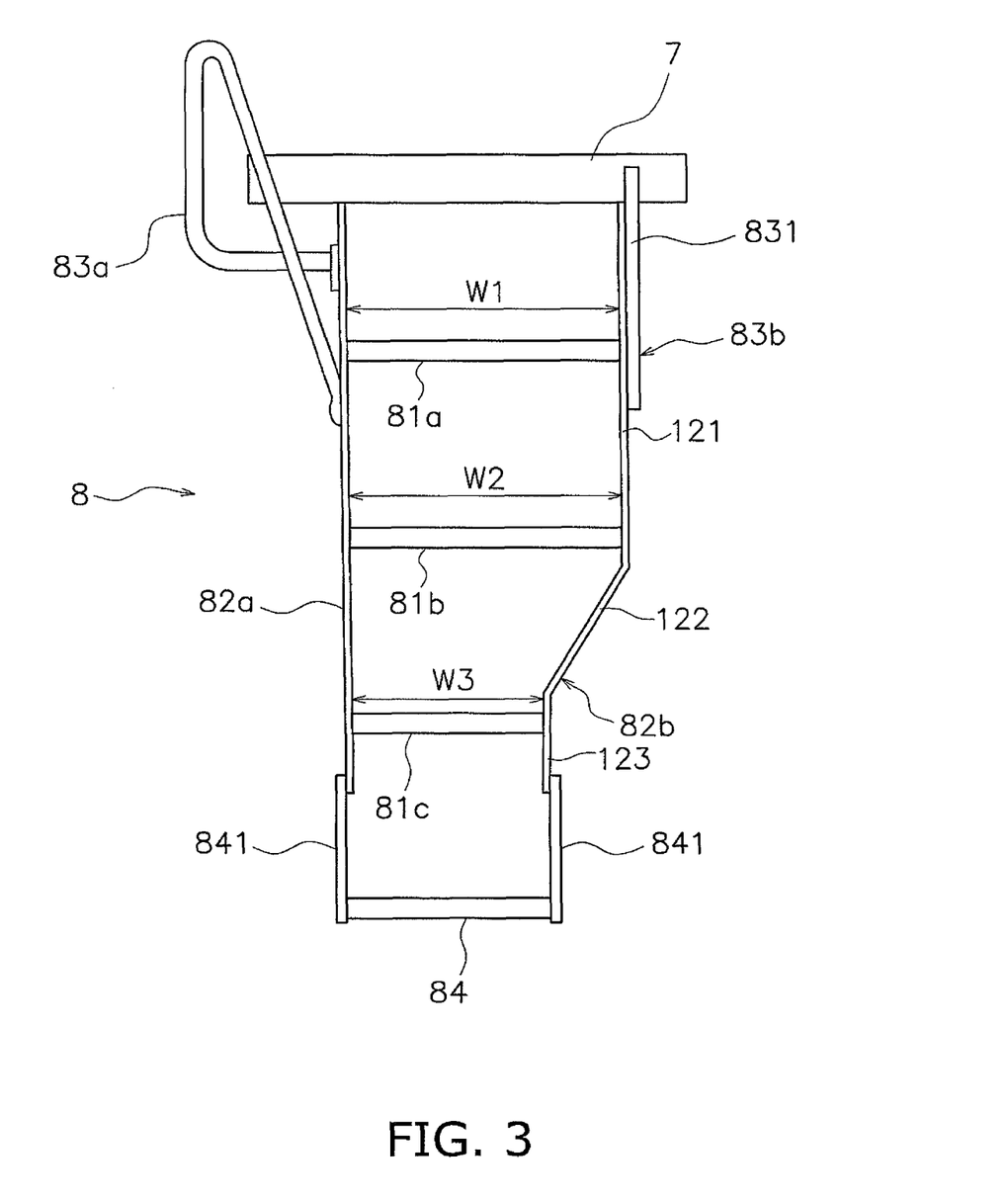
FIG. 3 is a side view of a ladder.
Figure 4:
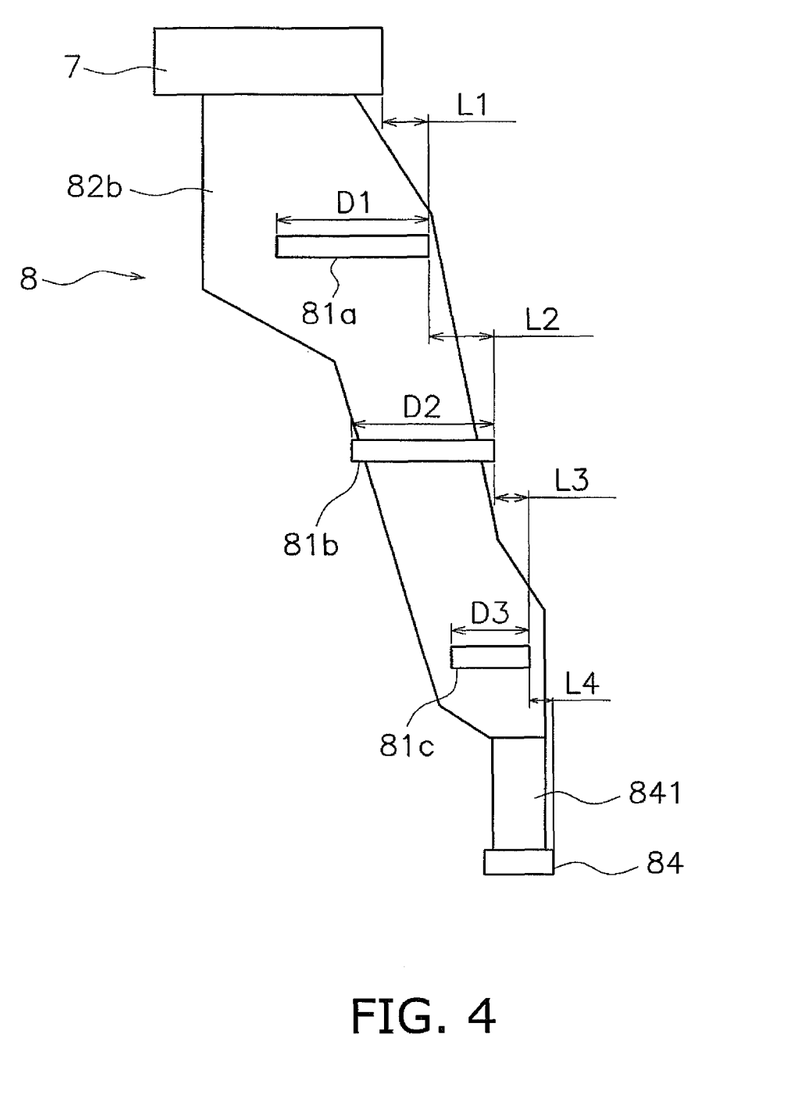
FIG. 4 is a front view of a ladder.

FIG. 3 is a side view illustrating the ladder 8 and the platform 7 as seen from the left side, and FIG. 4 is a front view illustrating the ladder 8 and the platform 7 as seen from the front. The description of a front strut 82a is omitted in FIG. 4. As illustrated in FIGS. 3 and 4, the ladder 8 has a plurality (e.g., three) of steps 81a to 81c, the front strut 82a, the rear strut 82b, first and second handrail members 83a and 83b, and a supplementary step 84. The three steps 81a to 81c are horizontally disposed with intervals therebetween in the vertical direction, and are disposed from the top in order of the first step 81a, the second step 81b, and the third step 81c. The steps 81a to 81c are rectangular plates as seen in a plan view and extend in the vehicle front-back direction of the vehicle. The first and second steps 81a and 81b are longer in the vehicle front-back direction and in the vehicle width direction than the third step 81c. For example, while not limited in particular, respective lengths W1 and W2 of the first and second steps 81a and 81b in the vehicle front-back direction are around 430 mm to 480 mm with respect to a length W3 of the third step 81c in the vehicle front-back direction being around 300 mm to 350 mm. For example, while not limited in particular, respective lengths D1 and D2 of the first and second steps 81a and 81b in the vehicle width direction are around 200 mm to 250 mm with respect to a length D3 of the third step 81c in the vehicle width direction being around 100 mm to 140 mm.

As illustrated in FIG. 4, the steps 81a to 81c project in the direction toward the left (toward the right in FIG. 4). Specifically, the second step 81b projects further to the left than the first step 81a, and the third step 81c projects further to the left than the second step 81b. The first step 81a projects further to the left than the platform 7. A projection amount L1 of the first step 81a and a projection amount L2 of the second step 81b are larger than a projection amount L3 of the third step 81c.

The projection amount L1 of the first step 81a is the distance in the vehicle width direction between the left edge (right edge in FIG. 4) of the first step 81a and the left edge of the platform 7. While not limited in particular, the projection amount L1 of the first step 81a is preferably around 85 mm to 100 mm. The projection amount L2 of the second step 81b is the distance in the vehicle width direction between the left edge of the second step 81b and the left edge of the first step 81a. While not limited in particular, the projection amount L2 of the second step 81b is preferably around 85 mm to 100 mm. The projection amount L3 of the third step 81c is the distance in the vehicle width direction between the left edge of the third step 81c and the left edge of the second step 81b. While not limited in particular, the projection amount L3 of the third step 81c is preferably around 50 mm to 65 mm. By making the projection amount of the step below the second step 81b smaller than the conventional projection amount in this way, the dimension of the entire ladder 8 in the vehicle width direction does not become as large as that of the conventional ladder. As a result, the risk of the ladder 8 colliding with an obstruction can be reduced.

As illustrated in FIG. 3, the front strut 82a and the rear strut 82b extend in the vertical direction and are provided with an interval therebetween in the vehicle front-back direction. The first to third steps 81a to 81c extend between the front strut 82a and the rear strut 82b. The front strut 82a is a plate-like member and extends vertically as seen in a side view. The rear strut 82b has an upper part 121, a middle part 122, and a lower part 123 in order from the top. The first step 81a and the second step 81b are fixed to the upper part 121. The third step 81c is fixed to lower part 123. The upper part 121 extends vertically downward from the platform 7. The middle part 122 extends downward and toward the front from the lower end of the upper part 121. Specifically, the middle part 122 is inclined so that the upper end thereof is positioned further to the rear than the lower end. The lower part 123 extends vertically downward from the lower end of the middle part 122. Specifically, the lower part 123 is positioned further toward the front than the upper part 121. Since the front strut 82a extends vertically downward, the first and second steps 81a and 81c extend further to the rear than the third step 81c.

The first handrail member 83a is provided on the front strut 82a, and the second handrail member 83b is provided on the rear strut 82b. The first and second handrail members 83a and 83b are used by the operator to ascend and descend the ladder 8. The second handrail member 83b has a vertical part 831 that extends vertically. The vertical part 831 is positioned to the left side of the rear strut 82b. The upper end of the second handrail member 83b is positioned below the upper surface of the platform 7.

A pair of elastic strips 841 that extend vertically downward are attached to the lower end parts of the front strut 82a and the rear strut 82b. The supplementary step 84 that extends in the vehicle front-back direction is provided so as to join the lower end parts of the elastic strips 841 together. The supplementary step 84 is shorter in the vehicle width direction and in the vehicle front-back direction than the first step 81a and the second step 81b, and preferably has approximately the same dimensions as the third step 81c as seen in a plan view.

As illustrated in FIG. 4, the supplementary step 84 projects further to the left (to the right in FIG. 4) than the third step 81c. A projection amount L4 of the supplementary step 84 is smaller than the projection amounts L1 to L3 of the steps 81a to 81c. The projection amount L4 of the supplementary step

84 is the distance in the vehicle width direction between the left edge (right edge in FIG. 4) of the supplementary step 84 and the left edge of the third step 81c. While not limited in particular, the projection amount L4 of the supplementary step 84 is preferably around 30 mm to 65 mm.

Figure 5:
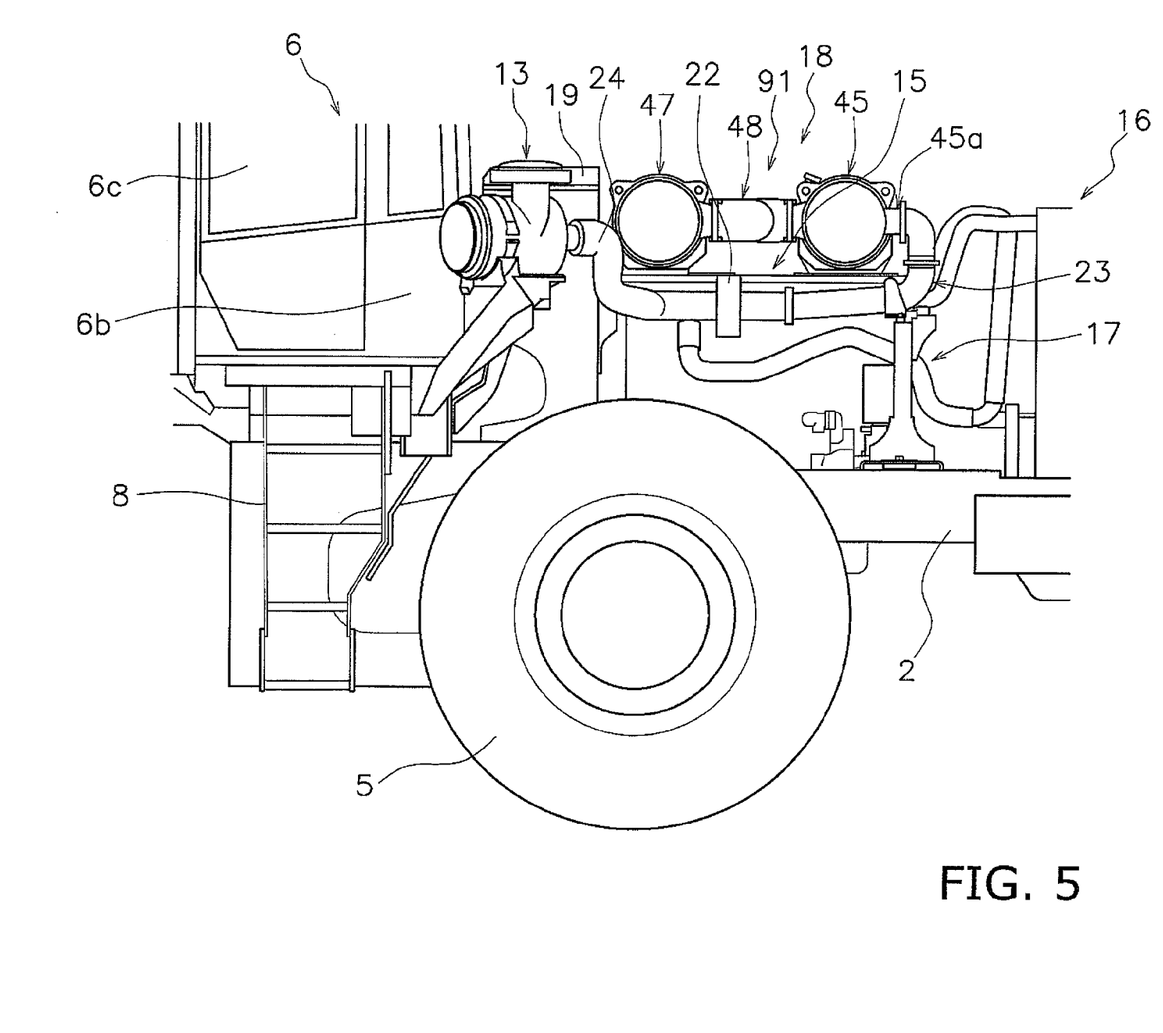
FIG. 5 is a side partial view with the vehicle body cover of the wheel loader of FIG. 1 removed.

FIG. 5 is a view of the rear body part as seen from the left side of the vehicle with a vehicle body cover 9 (FIG. 1) to the rear of the cab 6 and the rear wheel fender 5a (FIG. 1) removed. The vehicle body cover 9 is a member that defines an engine room 91 for housing the engine 15. Specifically, the vehicle body cover 9 covers the engine 15. As illustrated in FIG. 5, the engine 15, a cooling unit 16 disposed to the rear of the engine 15, a supporting mechanism 17, and an exhaust gas post-treatment device 18 mounted on the supporting mechanism 17 above the engine 15 are disposed in a rear part of the rear vehicle body part. An operating fluid tank 19 is disposed between the cab 6 and the engine 15.

The engine 15 is a so-called vertical mounted engine and is disposed so that a crankshaft extends in the vehicle front-back direction. The engine 15 is supported on the vehicle frame 2 via a rubber mount.

As illustrated in FIG. 5, a turbo charger 22 that supercharges air by exhaust gas is provided on the left side of the engine 15. The turbo charger 22 is provided so that an exhaust gas outlet faces to the rear. A connecting pipe 23 is provided between the turbo charger 22 and the exhaust gas post-treatment device 18. A flexible intake pipe 24 made of plastic is provided between the turbo charger 22 and the air cleaner 13. A difference in vibration between the engine 15 and the air cleaner 13 is absorbed by the intake pipe 24.

(Exhaust Gas Post-Treatment Device 18)

Figure 6:
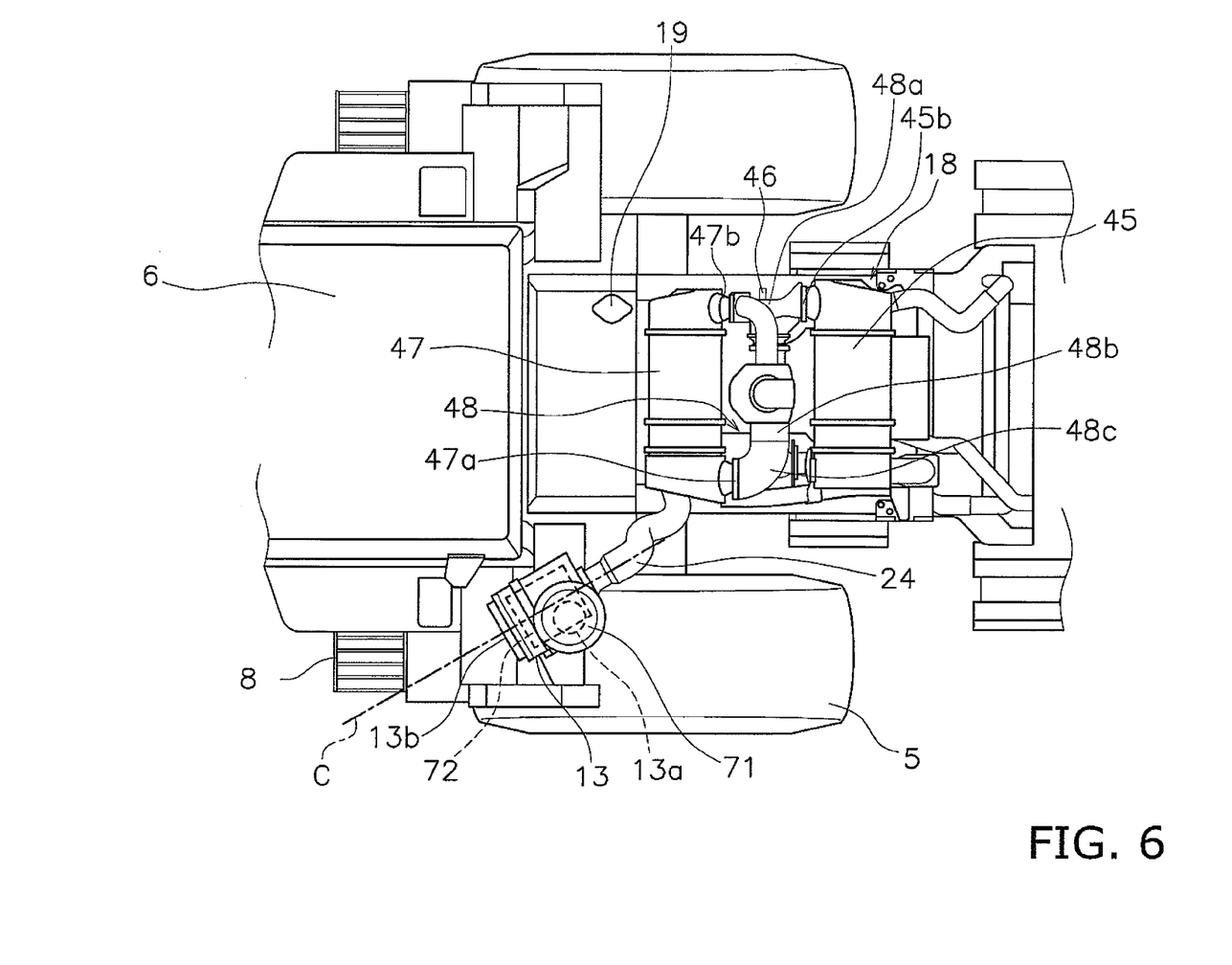
FIG. 6 is a plan view of a disposition of an air cleaner.

As illustrated in FIG. 6, the exhaust gas post-treatment device 18 is equipped with a diesel particulate filtering device 45, a connecting pipe 48, and a nitrogen oxide reduction catalyst device 47 in order from the exhaust gas upstream side of the engine 15 (hereinafter referred to simply as "upstream side"). A urea aqueous solution injection device 46 is attached to the connecting pipe 48.

The diesel particulate filtering device 45 collects particulate matter such as smoke and the like in the exhaust gas, and is mounted on the rear part of the base plate 28 of the supporting mechanism 17. The urea aqueous solution injection device 46 emits a urea aqueous solution sucked up by a pump that is not illustrated from a urea aqueous solution tank that is not illustrated, and adds the urea aqueous solution to the exhaust gas as a reducing agent. The added urea aqueous solution is hydrolyzed to become ammonia, and the ammonia is fed with the exhaust gas through the connecting pipe 48 to the nitrogen oxide reduction catalyst device 47. The ammonia from the urea aqueous solution injection device 46 is used as the reducing agent to purify by reduction the nitrogen oxides in the exhaust gas in the nitrogen oxide reduction catalyst device 47. The nitrogen oxide reduction catalyst device 47 is mounted on the front part of the base plate 28 of the supporting mechanism 17 in the same way as the diesel particulate filtering device 45. The diesel particulate filtering device 45 and the nitrogen oxide reduction catalyst device 47 are fixed to the base plate 28 with separate attachment plates.

The diesel particulate filtering device 45 and the nitrogen oxide reduction catalyst device 47 are disposed parallel to each other. Specifically, the diesel particulate filtering device 45 and the nitrogen oxide reduction catalyst device 47 are both cylindrical and the center axes thereof are disposed so as to extend in the crosswise direction and are parallel to each other. An exhaust gas inlet 45a is provided on the left end part of the diesel particulate filtering device 45, and an opening of the exhaust gas inlet 45a faces toward the rear. An exhaust gas outlet 45b is provided on the right end part of the diesel particulate filtering device 45, and an opening of the exhaust gas outlet 45b faces toward the front. An exhaust gas inlet 47a is provided on the left end part of the nitrogen oxide reduction catalyst device 47, and an opening of the exhaust gas inlet 47a faces toward the rear. An exhaust gas outlet 47b is provided on the right end part of the nitrogen oxide reduction catalyst device 47, and an opening of the exhaust gas outlet 47b faces toward the rear and obliquely upward. The connecting pipe 48 is disposed between the exhaust gas outlet 45b of the diesel particulate filtering device 45 and the exhaust gas inlet 47a of the nitrogen oxide reduction catalyst device 47.

As illustrated in FIG. 6, the connecting pipe 48 has a first bend section 48a, a linear section 48b, and a second bend section 48c, and the entire connecting pipe 48 forms an S shape. The first bend section 48a is located near the exhaust gas outlet 45b of the diesel particulate filtering device 45, and the second bend section 48c is located near the exhaust gas inlet 47a of the nitrogen oxide reduction catalyst device 47. The linear section 48b is located between the first bend section 48a and the second bend section 48c and is disposed parallel to the diesel particulate filtering device 45 and the nitrogen oxide reduction catalyst device 47.

The urea aqueous solution injection device 46 is provided on the first bend section 48a and emits the urea aqueous solution into the connecting pipe 48. The emitted urea aqueous solution becomes evenly mixed with the exhaust gas while passing through the long linear section 48b.

(Air Cleaner 13)

The air cleaner 13 and a disposition thereof are explained with reference to FIGS. 2 and 7. The air cleaner 13 is disposed outside of the engine room, that is, to the outside of the vehicle body cover 9, and is disposed above and to the rear of the ladder 8. The air cleaner 13 is disposed in a position to allow the operator to reach the air cleaner 13 with his hands while standing on the first step 81a or the second step 81b of the ladder 8. Specifically, the air cleaner 13 is provided on the upper part of the rear wheel fender 5a. Specifically, the air cleaner 13 is mounted on the horizontal portion of the fender front part 5b.

As illustrated in FIG. 2, except for a portion thereof, the air cleaner 13 is covered by an air cleaner cover 70 that is provided on the outside of the vehicle body cover 9. FIG. 7 is a plan view of the air cleaner 13 and portions that are related to the air cleaner 13 with the vehicle body cover 9 and the air cleaner cover 70 removed.

Figure 7:
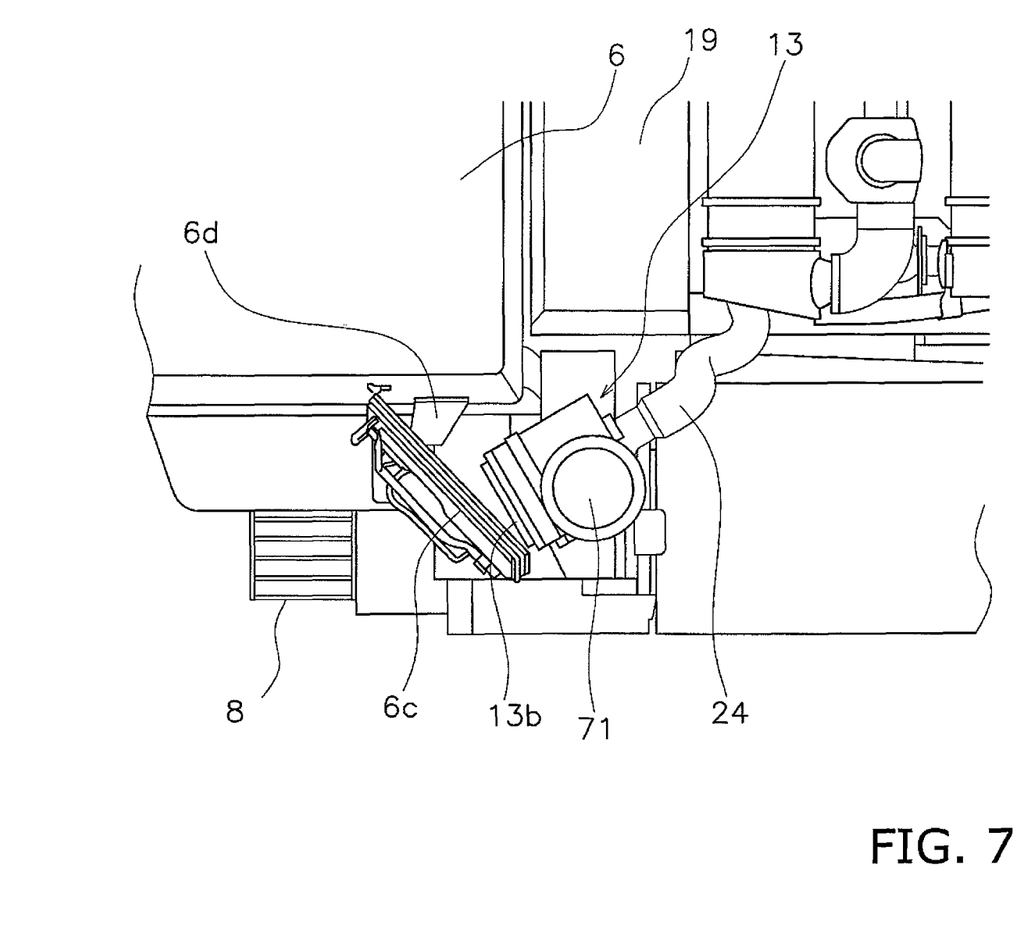
FIG. 7 illustrates a relationship between the air cleaner and a door.

As illustrated in FIGS. 2, 6, and 7, the air cleaner 13 is cylindrical, a cap 71 that covers an air intake mouth 13a is provided on the upper part of the air cleaner 13, and a lid 13b that can be opened and closed is provided on the front part of the air cleaner 13. A filter 72 is provided in an attachable and detachable manner inside the air cleaner 13. The air cleaner cover 70 covers most of the air cleaner 13 excluding the front end part to which the air intake mouth 13a, the cap 71, and the lid 13b are attached. The filter 72 can be maintained and exchanged by opening the lid 13b and pulling the filter 72 out obliquely toward the front.

The disposition of the air cleaner 13 is explained in detail below.

As illustrated in FIG. 7, the air cleaner 13 is disposed on the upper part of the fender front part 5b of the rear wheel fender 5a to the rear of the cab 6. More specifically, the front part of the air cleaner 13 is located to the rear of the ladder 8 and to the left of the rear end part of the cab 6, and the rear part of the air cleaner 13 is located to the left of the front part of the operating fluid tank 19. A center axis C of the air cleaner 13 is substantially horizontal and is inclined with respect to the center axis extending to the front and rear of the vehicle so that the front part of the air cleaner 13 is further away from the cab 6 than the rear part. As described above, the filter 72 can be pulled out toward the front along the center axis C.

As described above, the stopper 6d for limiting the maximum opening degree of the door 6c is provided on the cab 6, and the front part of the air cleaner 13 is positioned so as to not obstruct the door 6c even when the door 6c is opened to the greatest amount to make contact with the stopper 6d.

Figure 8:
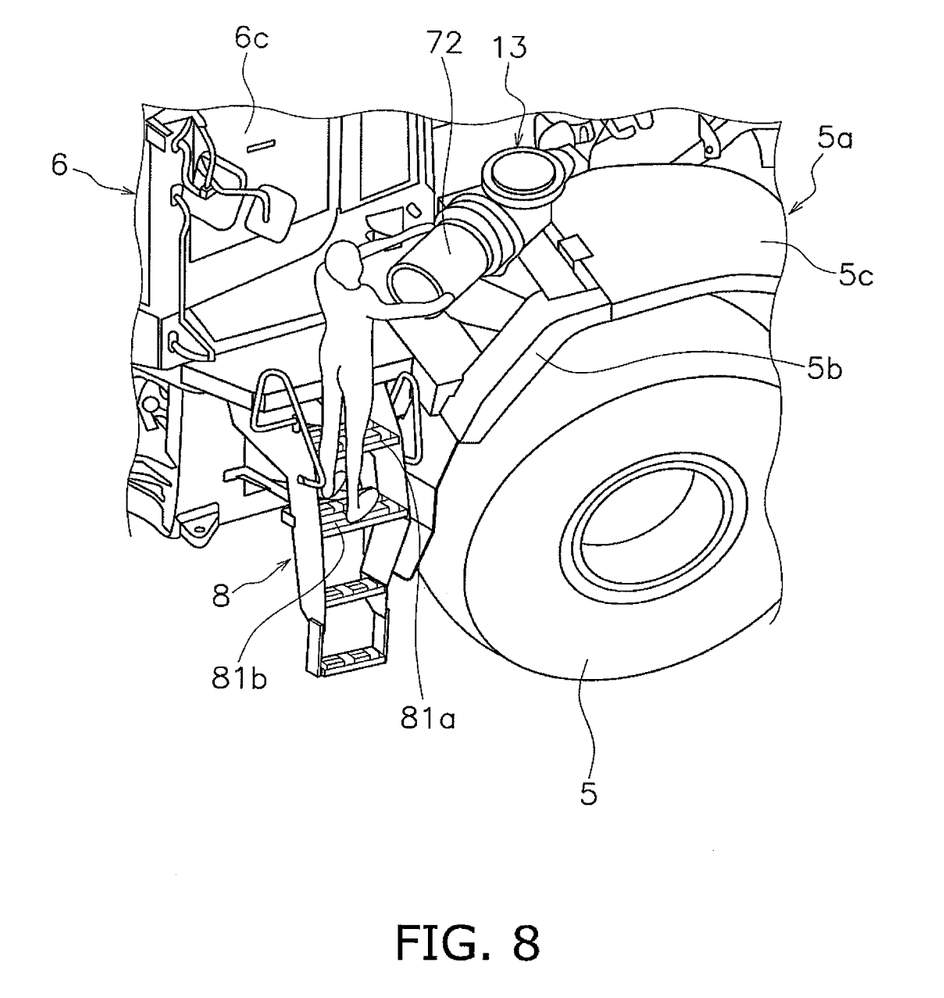
FIG. 8 illustrates an appearance of maintenance work on the air cleaner.

Due to the disposition of the air cleaner 13 as described above, the operator can stand on at least one of the first step 81a and the second step 81b of the ladder 8 and open the lid 13b of the air cleaner 13 to easily perform maintenance work or exchange work of the filter 72 as illustrated in FIG. 8.

(Flow of Air and Exhaust Gas)

As illustrated in FIG. 5, air is introduced from the air cleaner 13 and fed into the engine 15 through the intake pipe 24 and the turbo charger 22. Exhaust gas from the engine 15 is introduced through the connecting pipe 23 into the exhaust gas post-treatment device 18 after driving the turbo charger 22.

Particulate matter such as smoke is collected by the diesel particulate filtering device 45 in the exhaust gas post-treatment device 18. Next, the particulate matter is introduced into the urea aqueous solution injection device 46. Urea aqueous solution is emitted into the exhaust gas in the urea aqueous solution injection device 46. The emitted urea aqueous solution mixes with the exhaust gas inside the connecting pipe 48. Consequently, the urea aqueous solution is hydrolyzed by the heat of the exhaust gas and water vapor in the exhaust gas to become ammonia. The ammonia generated in this way is fed with the exhaust gas through the connecting pipe 48 to the nitrogen oxide reduction catalyst device 47. The ammonia is used as the reducing agent to purify by reduction the nitrogen oxides in the exhaust gas in the nitrogen oxide reduction catalyst device 47.

(Air Cleaner 13 Maintenance Work)

Exchange work and cleaning of the filter 72 are required at certain time periods in the air cleaner 13. At this time, the filter 72 is necessarily removed from the air cleaner 13.

When removing the filter 72 from the air cleaner 13, the operator stands on at least one of the first step 81a and the second step 81b of the ladder 8 and opens the lid 13b of the air cleaner 13 as illustrated in FIG. 8. The filter 72 of the air cleaner 13 may be pulled out toward the front along the center axis C of the air cleaner 13. At this time, since the air cleaner 13 is inclined so that the front side thereof is further away from the cab 6 than the rear side thereof, the work to remove the filter 72 is easy to perform.

(Characteristics)

(1) Since the air cleaner 13 is disposed outside of the vehicle body cover 9 and above and to the rear of the ladder 8, the diesel particulate filtering device 45 and the nitrogen oxide reduction catalyst device 47 can be disposed above the engine 15 without making the top plate of the engine room 91 higher. Therefore, a reduction in visibility to the rear can be avoided even if the nitrogen oxide reduction catalyst device 47 is added to the exhaust gas post-treatment device 18.

(2) Since the air cleaner 13 is disposed above and to the rear of the ladder 8, maintenance work on the air cleaner can be performed by the operator while standing on the ladder and the maintenance work can be performed easily. The first and second steps 81a and 81b are longer in the vehicle front-back direction and in the vehicle width direction than the third step 81c. According to this configuration, the operator is able to perform the maintenance work on the air cleaner while maintaining a stable posture on at least one of the first step 81a and the second step 81b.

(3) The first and second steps 81a and 81b have a larger projection amount than the third step 81c. As a result, the operator is able to stand on the first step 81a and perform the maintenance work on the air cleaner without hitting the platform 7 with a shin or other body part. Similarly, the operator is able to stand on the second step 81b and perform the maintenance work on the air cleaner without hitting the platform 7 with a shin or other body part. By increasing the projection amounts of only the first and second steps 81a and 81b without increasing the projection amounts of all the steps 81a to 81c equally, obstruction while traveling due to the ladder 8 projecting excessively to the left can be avoided.

(4) The front side from which the filter 72 is pulled out is inclined so as to be further away from the cab 6 than the rear side. Therefore, the operator can easily pull out the filter 72 while standing on at least one of the first and second steps 81a and 81b of the ladder 8 and maintenance work can be conducted more easily.

(5) In the rear strut 82b of the ladder 8, the upper part 121 to which the first and second steps 81a and 81b are fixed is positioned to the rear more than the lower part 123 to which the third step 81c is fixed. As a result, the first and second steps 81a and 81b extend further to the rear than the third step 81c, and the operator is able to perform the maintenance work in a position nearer the air cleaner 13.

(6) The vertical part 831 of the second handrail member 83b extends vertically on the left side of the rear strut 82b. Thus, the operator is able to perform the maintenance work while applying his weight onto the vertical part 831, and consequently is able to perform the maintenance work of the air cleaner while maintaining a more stable posture.

MODIFIED EXAMPLES

The present invention is not limited to the above embodiments and various changes and modifications may be made without departing from the spirit of the invention.

Modified Example 1

While the ladder 8 has the three steps including the first to third steps 81a to 81c in the above embodiment, the ladder 8 is not limited in particular and may have four or more steps. Even in this case, the first step that is positioned nearest to the top and the second step that is positioned second from the top are longer in the vehicle front-back direction and in the vehicle width direction than the other steps therebelow.

Modified Example 2

While the air cleaner 13 is fixed to the rear wheel fender 5a in the previous embodiment, the air cleaner 13 may be fixed to another member so long as the air cleaner is positioned above and to the rear of the ladder.

Modified Example 3

While a case in which the rear wheel fender 5a is divided into two parts and the air cleaner 13 is fixed to the fender front part 5b is described in the previous embodiment, the air cleaner 13 may be fixed to the upper part of an integrated rear wheel fender.

Modified Example 4

While a case in which the ladder 8 and the air cleaner 13 are provided on the left side of the cab 6 is described in the previous embodiment, the ladder 8 and the air cleaner 13 may be provided on the right side of the cab 6.

What is claimed is:

1. A wheel loader, comprising:
   a cab having a driver seat provided therein;
   a ladder useable to ascend to and descend from the cab, the ladder being provided to a first side of the cab in a vehicle width direction of the wheel loader, the ladder having at least three steps disposed with intervals therebetween in a vertical direction;
   a vehicle body cover disposed to a rear of the cab and defining an engine room;
   an engine disposed inside the engine room;
   an air cleaner having a filter therein, the filter being exchangeable and being configured to clean air supplied to the engine; and
   a platform disposed to the first side of the cab,
   the air cleaner being disposed outside of the vehicle body cover and above and to the rear of the ladder,
   the ladder extending downward from the platform, the ladder having
      a first step positioned at a top of the ladder that projects outward by a projection amount in the vehicle width direction with respect to the platform, and
      steps below the first step, each of the steps below the first step projecting outward by a projection amount in the vehicle width direction with respect to one step above,
      the projection amount in the vehicle width direction of at least one of the first step and a second step positioned second from the top of the ladder is larger than the projection amount in the vehicle width direction of the step below the second step.

2. The wheel loader according to claim 1, wherein
   the first step and the second step are longer in a vehicle front-back direction and in the vehicle width direction than other steps.

3. A wheel loader, comprising:
   a cab having a driver seat provided therein;
   a ladder useable to ascend to and descend from the cab, the ladder being provided to a first side of the cab in a vehicle width direction of the wheel loader, the ladder having at least three steps disposed with intervals therebetween in a vertical direction;
   a vehicle body cover disposed to a rear of the cab and defining an engine room;
   an engine disposed inside the engine room;
   an air cleaner having a filter therein, the filter being exchangeable and being configured to clean air supplied to the engine; and
   a platform disposed to the first side of the cab, the ladder extending downward from the platform,
   the air cleaner being disposed outside of the vehicle body cover and above and to the rear of the ladder, the air cleaner being configured to allow the filter to be pulled out toward the ladder, and the air cleaner being inclined so that a side from which the filter can be pulled out is further away from the cab than an opposite side.

4. The wheel loader according to claim 1, wherein
   the ladder has a front strut and a rear strut, and the front and rear struts extend in the vertical direction and are disposed away from each other in a vehicle front-back direction;
   the steps extend between the front strut and the rear strut; and
   the rear strut has an upper part to which the first and second steps are attached, and a lower part to which other steps are attached, and the lower part is positioned further toward the front than the upper part.

5. The wheel loader according to claim 4, wherein
   the rear strut further has a middle part that couples the upper part and the lower part; and
   the middle part is inclined rearward in an upward direction as seen in a side view.

6. The wheel loader according to claim 4, wherein
   the ladder has a handrail member provided on the rear strut;
   the handrail member has a vertical part that extends vertically; and
   the vertical part is positioned outward of the rear strut in the vehicle width direction.

7. The wheel loader according to claim 6, wherein
   an upper end of the handrail member is positioned lower than an upper surface of the platform.

8. The wheel loader according to claim 1, wherein
   the ladder has a supplementary step in a lowest position that hangs down by an elastic strip.

9. The wheel loader according to claim 1, wherein
   the cab has a cab body and a door openable and closeable toward a front, and a rear of the door is supported by the cab body; and
   the air cleaner is disposed at a location that does not obstruct the door when the door is open.

10. The wheel loader according to claim 1, further comprising:
    an operating fluid tank disposed between the cab and the engine,
    the air cleaner being disposed to a side of the operating fluid tank.

11. The wheel loader according to claim 1, further comprising:
    a rear wheel fender disposed above a rear wheel,
    the air cleaner being fixed to an upper part of the rear wheel fender.

12. The wheel loader according to claim 1, further comprising:
    an air cleaner cover covering a portion where a filter pull-out opening and an air intake mouth are located in the air cleaner.

13. A wheel loader comprising:
    a cab having a driver seat provided therein;
    a ladder useable to ascend to and descend from the cab, the ladder being provided to a first side of the cab in a vehicle width direction of the wheel loader, the ladder having at least three steps disposed with intervals therebetween in a vertical direction;
    a vehicle body cover disposed to a rear of the cab and defining an engine room;
    an engine disposed inside the engine room;
    an air cleaner having a filter therein, the filter being exchangeable and being configured to clean air supplied to the engine; and
    a platform disposed to the first side of the cab,
    the air cleaner being disposed outside of the vehicle body cover and above and to the rear of the ladder,
    the ladder extending downward from the platform, the ladder having
       a first step positioned at a top of the ladder that projects outward by a projection amount in the vehicle width direction with respect to the platform, and
       steps below the first step, each of the steps below the first step projecting outward by a projection amount in the vehicle width direction with respect to one step above,
       the projection amount in the vehicle width direction of a third step positioned at a bottom of the ladder being smaller than at least one of the projection amount of the first step and the projection amount of a second step positioned second from the top of the ladder.

14. The wheel loader according to claim 13, wherein the third step is shorter in a vehicle front-back direction and in the vehicle width direction than the first step and the second step.

15. The wheel loader according to claim 1, further comprising
a door pivotably attached to a cab body of the cab on the first side of the cab, the door being pivotably openable in a rearward direction toward the air cleaner; and
a stopper provided on the cab body rearward of the door, the stopper being configured and arranged to contact the door to limit a maximum degree of opening of the door, the air cleaner is disposed at a location that does not obstruct the door when the door contacts the stopper.

16. The wheel loader according to claim 1, wherein at least a portion of the air cleaner is disposed farther outward in the vehicle width direction than the cab in a top plan view of the wheel loader.

17. The wheel loader according to claim 1, wherein at least a portion of the air cleaner overlaps a rear wheel of the wheel loader in a top plan view of the wheel loader.

* * * * *